(12) United States Patent
Zhao et al.

(10) Patent No.: US 10,139,256 B2
(45) Date of Patent: Nov. 27, 2018

(54) MEMS FLOW SENSOR

(71) Applicant: MEMSIC, INC., Andover, MA (US)

(72) Inventors: Yang Zhao, Andover, MA (US); Ohlan Silpachai, Newbury Park, CA (US); Francis Man, Lexington, MA (US); Zhengxin Zhao, Medford, MA (US)

(73) Assignee: ACEINNA, INC., Andover, MA (US)

( * ) Notice: Subject to any disclaimer, the term of this patent is extended or adjusted under 35 U.S.C. 154(b) by 0 days.

(21) Appl. No.: 14/816,628

(22) Filed: Aug. 3, 2015

(65) Prior Publication Data

US 2017/0038235 A1 Feb. 9, 2017

(51) Int. Cl.
G01F 1/684 (2006.01)
G01F 1/692 (2006.01)

(52) U.S. Cl.
CPC .......... G01F 1/6847 (2013.01); G01F 1/6845 (2013.01); G01F 1/692 (2013.01)

(58) Field of Classification Search
CPC ....... G01F 1/6845; G01F 1/6857; G01F 1/692
See application file for complete search history.

(56) References Cited

U.S. PATENT DOCUMENTS

| | | | |
|---|---|---|---|
| 4,658,331 A | 4/1987 | Berg | |
| 5,161,410 A | 11/1992 | Davey et al. | |
| 7,255,001 B1 * | 8/2007 | Davis | G01F 1/6845 73/204.26 |
| 7,691,652 B2 * | 4/2010 | Van Der Wiel | G01F 1/6845 257/E21.521 |
| 7,703,339 B2 * | 4/2010 | Sulouff, Jr. | G01F 1/36 73/861.85 |
| 2009/0158838 A1 | 6/2009 | Speldrich | |
| 2009/0164163 A1 | 6/2009 | Wang et al. | |
| 2010/0037706 A1 | 2/2010 | Sparks et al. | |
| 2011/0252882 A1 * | 10/2011 | Beck | G01F 1/6845 73/204.27 |

* cited by examiner

*Primary Examiner* — Justin Olamit

(74) *Attorney, Agent, or Firm* — Preti Flaherty Beliveau & Pachios LLP

(57) ABSTRACT

A MEMS flow sensor is provided having a micro flow channel etched in a silicon structure composed of two silicon substrates bonded or fused together. A heater and one or more temperature sensors are, in one embodiment, disposed around the perimeter of the flow channel and outside of the channel. In another embodiment, a heater and one or more temperature sensors are respectively disposed outside the flow channel at the top and bottom of the channel. In further embodiments, a heater and one or more temperature sensors are located inside the flow channel on one or more surfaces thereof or around the inside perimeter of the channel. The flow sensors in accordance with the invention are preferably fabricated using wafer scale fabrication techniques.

15 Claims, 9 Drawing Sheets

MEMS FLOW SENSOR

STATEMENT REGARDING FEDERALLY SPONSORED RESEARCH OR DEVELOPMENT

N/A

BACKGROUND OF THE INVENTION

Micro-Electro-Mechanical Systems (MEMS) based thermal sensors are known in many different configurations. A basic MEMS flow sensor includes a heater and at least one temperature sensor in the near vicinity to detect heat fluctuation as fluid moves over the heater and temperature sensor(s). The rate of fluid movement over the heater and temperature sensor(s) can be used to determine flow rate.

Existing MEMS flow sensors utilize a heater and temperature sensors on a single plane inside the flow channel on a diaphragm or suspended bridge. One known form of flow sensor is shown in FIG. 1A in which a heater 10 and temperature sensors 12 are supported on a diaphragm or membrane 14 which is disposed in a flow channel 16. Another known version of a flow sensor is shown in FIG. 1B in which a heater 10A and temperature sensors 12A are formed in a silicon plate 18 which is placed in a flow channel 16A. The sensing of temperature in only one plane limits the performance of the device. Thermal convection is omnidirectional and sensing in only a single plane is inefficient.

A raw response curve from thermopiles on a single plane MEMS sensor is typically in the shape of a square root function with sensitivity highest at low flow and gradually decreasing as flow increases. This square root shape reflects the inefficiency of the etched conductors on a single plane.

It would be beneficial to have a thermal flow sensor with improved thermal efficiency, sensitivity and measuring range.

BRIEF SUMMARY OF THE INVENTION

In accordance with the invention a MEMS flow sensor is provided having a micro flow channel etched in a silicon structure composed of two silicon substrates bonded or fused together or a silicon substrate bonded with a glass substrate. At least one heater and one or more temperature sensors are, in one embodiment, disposed around the perimeter of the flow channel and outside of the channel. In another embodiment, a heater and one or more temperature sensors are respectively disposed outside the flow channel at the top and bottom of the channel. In further embodiments, a heater and one or more temperature sensors are located inside the flow channel on one or more surfaces thereof or around the inside perimeter of the channel. The flow sensors in accordance with the invention are preferably fabricated using wafer scale fabrication techniques which per se are known in the art.

The micro flow channel is of a size which improves the sensitivity of the thermal flow sensor since a greater percentage of the measured liquid or gas is heated in comparison with a much larger conventional flow channel in which the heater power remains constant. The micro flow channel also increases the flow impedance to thereby permit much less fluid to flow into the sensor channel. The micro channel is suitable for micro liter per minute or nano liter per minute liquid flow rates.

The MEMS micro flow channel sensors can be used in a bypass to a main flow channel to measure only a portion of the bulk flow. The high flow impedance of the micro flow channel prevents contaminants from entering the bypass channel since momentum to carry particles into the bypass channel is greatly reduced. The use of a micro flow channel in a bypass arrangement is particularly applicable where high sensitivity and contamination immunity is required. Such applications include natural gas metering, mass air flow for internal combustion engines and exhaust gas recirculation for gasoline and diesel engines.

In a preferred embodiment the MEMS flow sensor is integrated in a single chip with associated circuitry. Typically such circuitry includes signal conditioning, amplification, analog to digital conversion, memory storage and digital interface. Wireless transmitter and receiver circuitry can also be integrated into the same chip as the sensor and other circuitry.

Each silicon substrate may include one-half of a flow channel such that when the two substrates are joined or fused together, the completed flow channel is formed. In another embodiment, only one substrate contains the flow channel and the other substrate which could be either glass or silicon provides a cap over the channel. The heater and one or more temperature sensors can be configured inside or outside the flow channel and can be disposed on one or more walls of the flow channel or as loops or coils around the channel. Forming a heater and temperature sensor on more than one plane of the flow channel walls increases the magnitude of the sensor signal since heat is sensed over a larger surface area. The increase in thermal signal leads to higher sensitivity and increases the sensor dynamic range to thereby increase the power efficiency. When the width of the flow channel is larger than the height, temperature sensors and heaters located on the sidewalls are usually unnecessary as the signal gain will be minimal. The wall structures around the flow channel can have etched cavities or thinned walls to reduce heat loss through the silicon material. A thin layer of silicon nitride or other insulating material can be coated over the heater and temperature sensor surfaces to prevent oxidation.

The flow channel has an inlet and an outlet opening which are in fluid coupling relationship with respective fluid ports. The fluid coupling from the inlet and outlet of the flow channel can be direct to respective fluid ports or via intermediate fluid structures.

BRIEF DESCRIPTION OF THE SEVERAL VIEWS OF THE DRAWINGS

The invention will be more fully understood from the following detailed description in conjunction with the drawings, in which.

DETAILED DESCRIPTION OF THE INVENTION

Figure 1A:
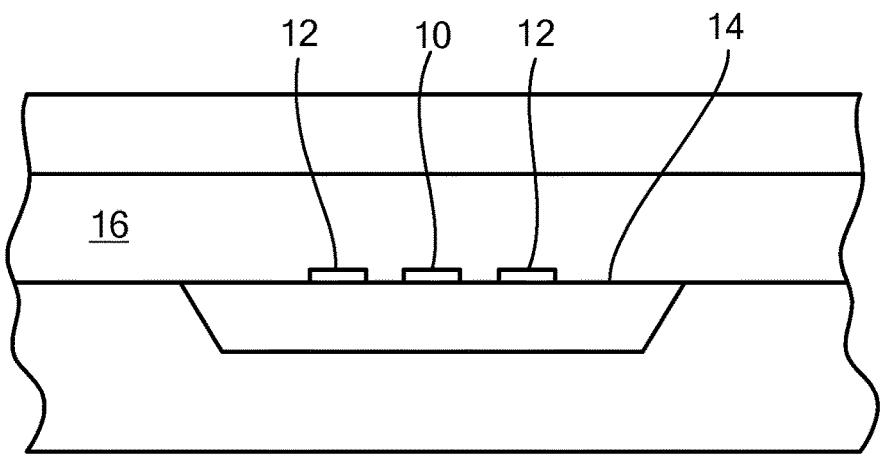
FIG. 1A is a diagrammatic elevation view of one embodiment of a known fluid flow sensor.
Figure 1B:
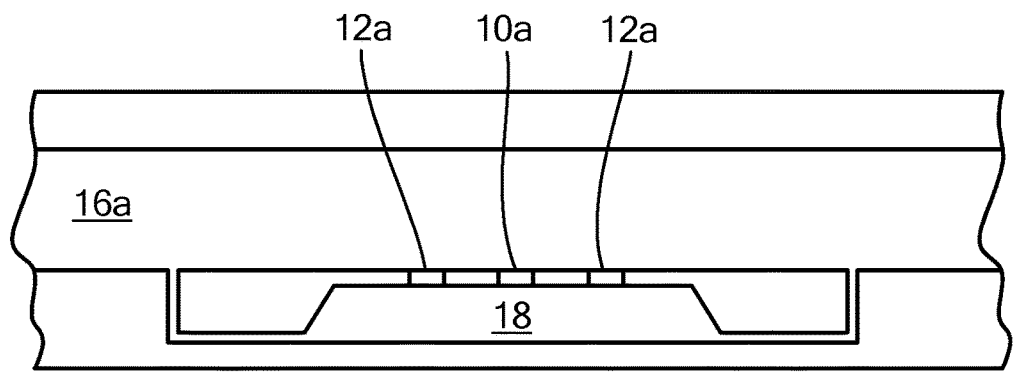
FIG. 1B is a diagrammatic elevation view of another known fluid flow sensor.
Figure 2A:
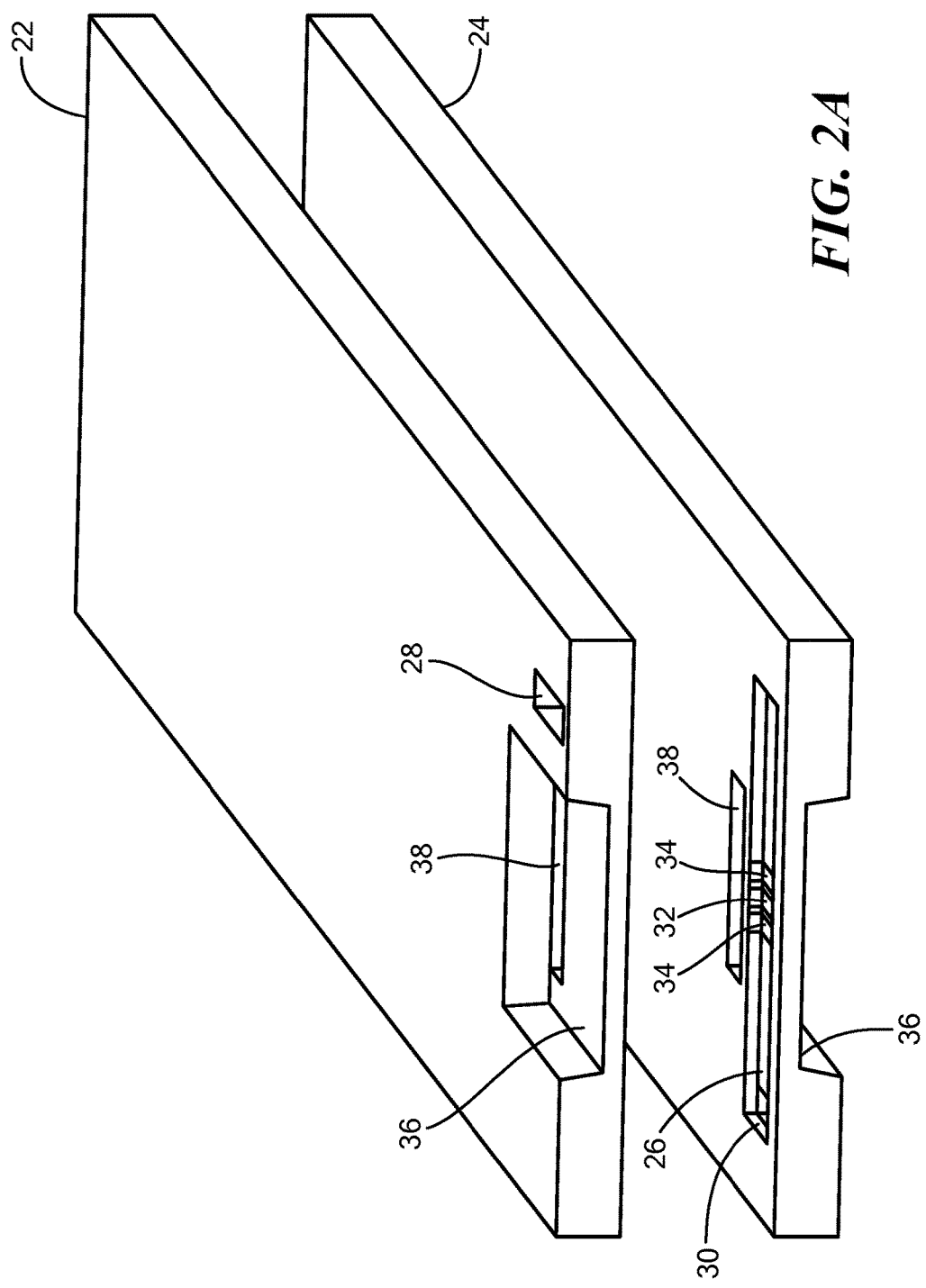
FIG. 2A is an exploded pictorial view of one embodiment of a flow sensor in accordance with the invention.
Figure 2B:
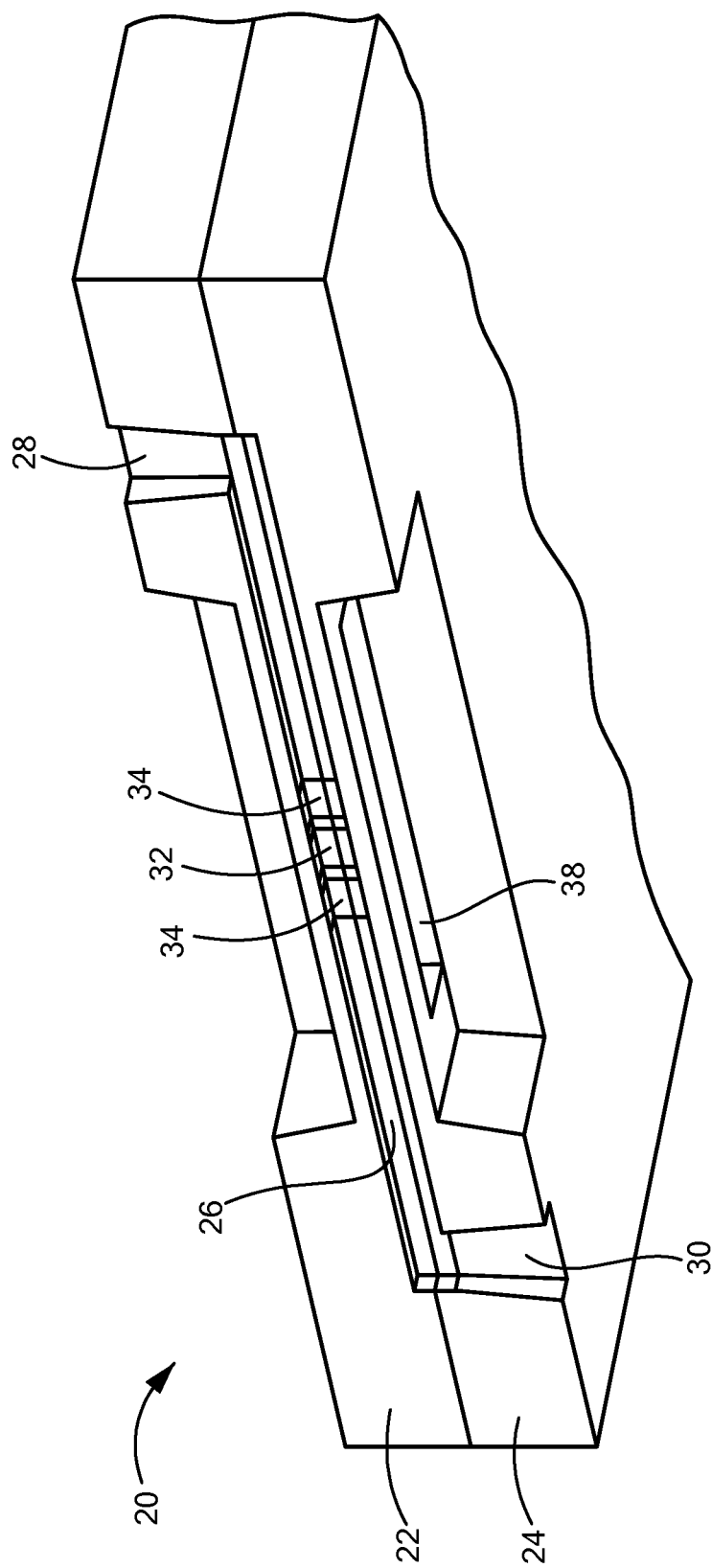
FIG. 2B is a cross-sectional pictorial view of the embodiment of FIG. 2A.
Figure 3A:
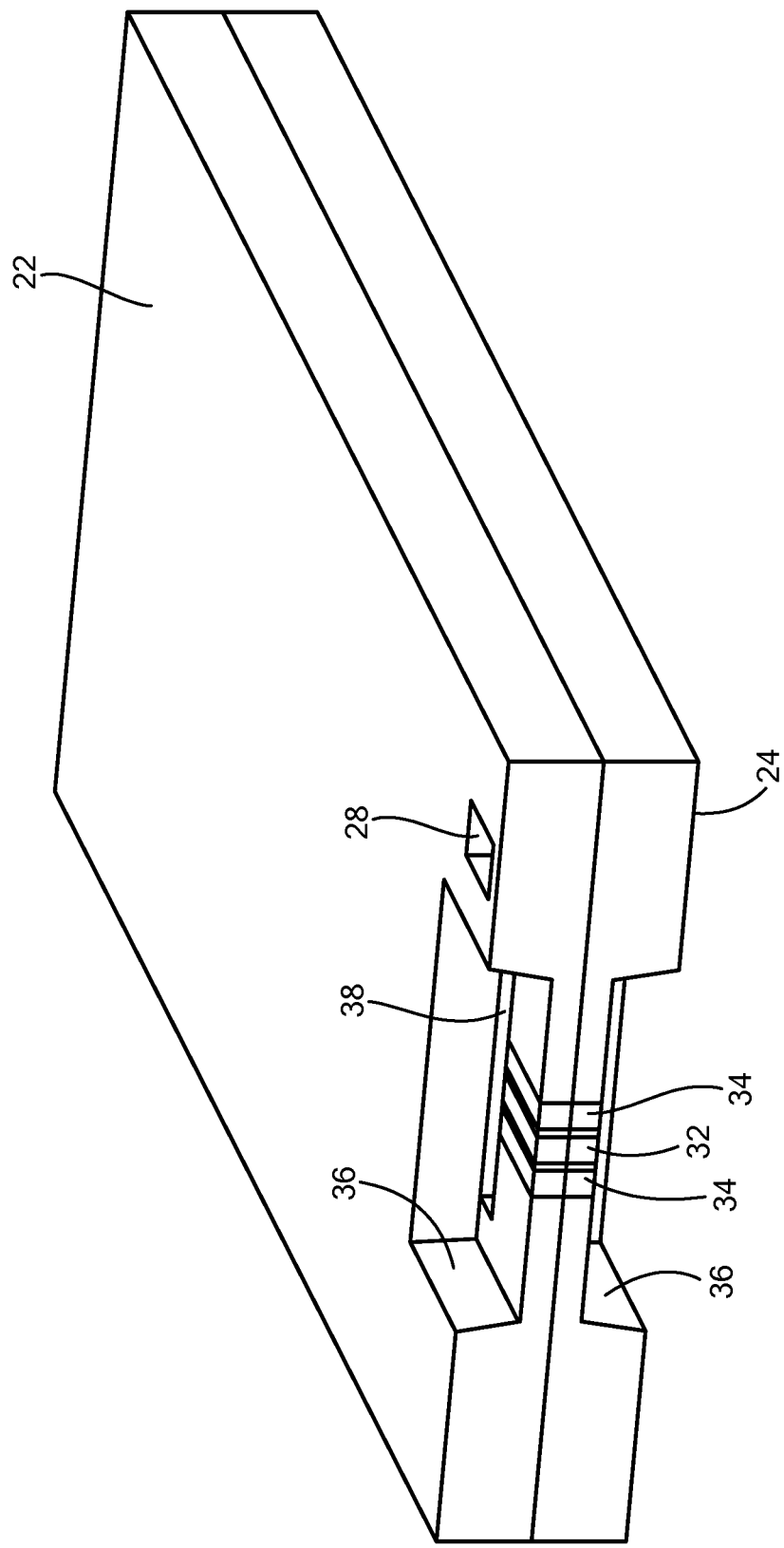
FIG. 3A is a pictorial view of another embodiment of a flow sensor in accordance with the invention.
Figure 3B:
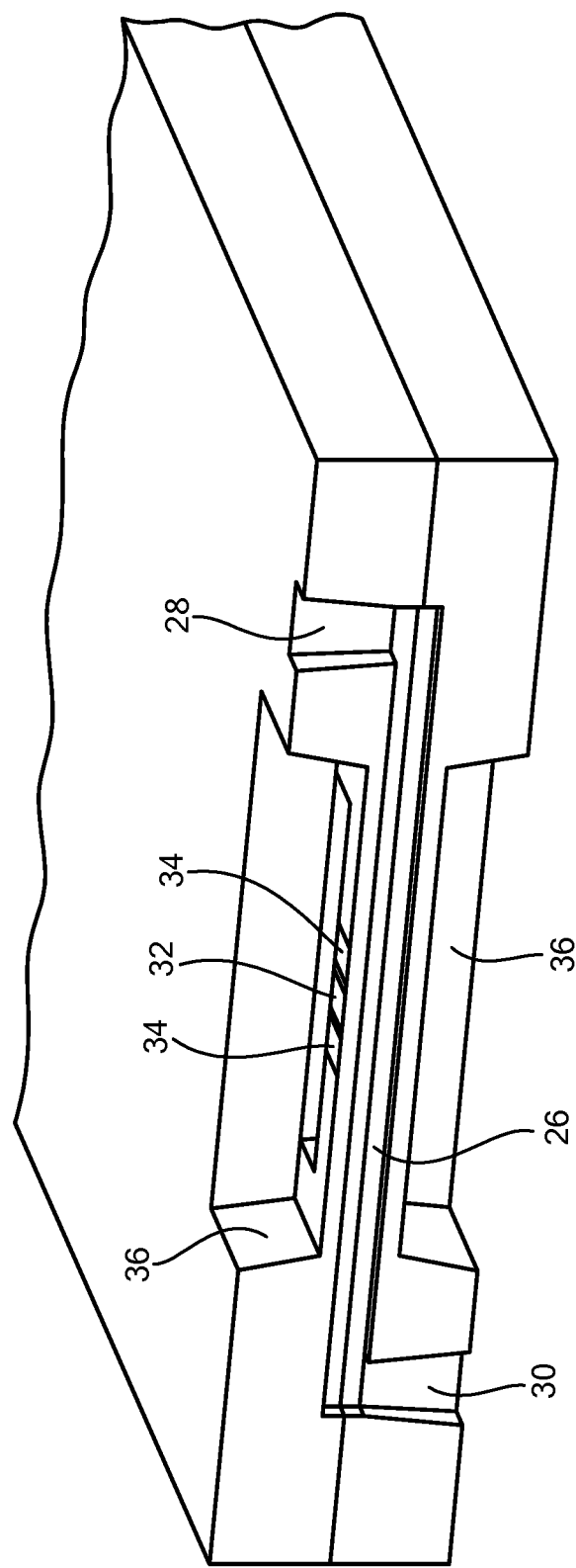
FIG. 3B is a cross-sectional pictorial view of the embodiment of FIG. 3A.
Figure 3D:
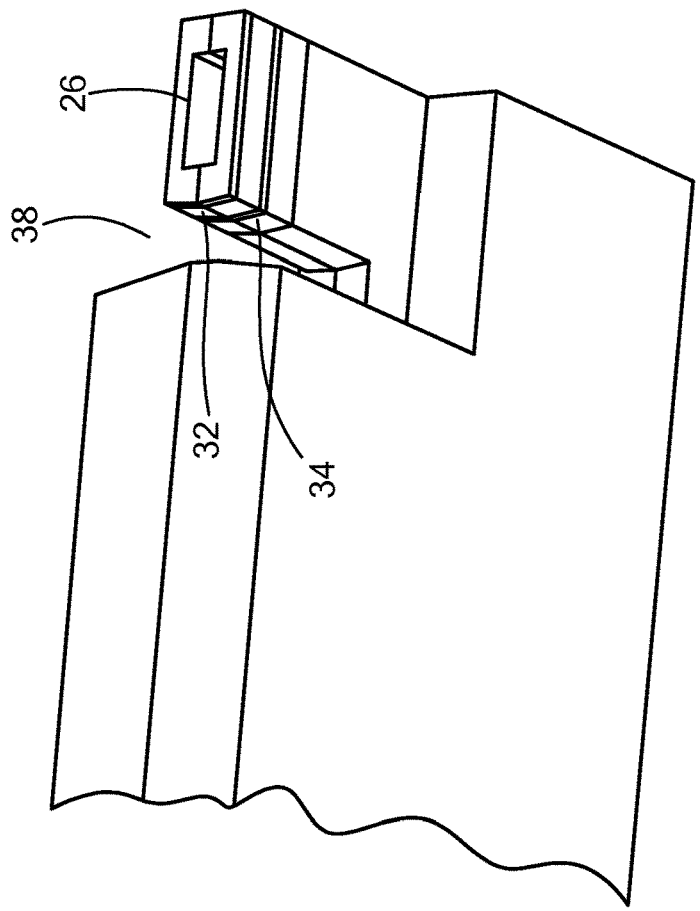
FIG. 3D is a cross-sectional pictorial view of the embodiment of FIGS. 3A-3C.
Figure 3C:
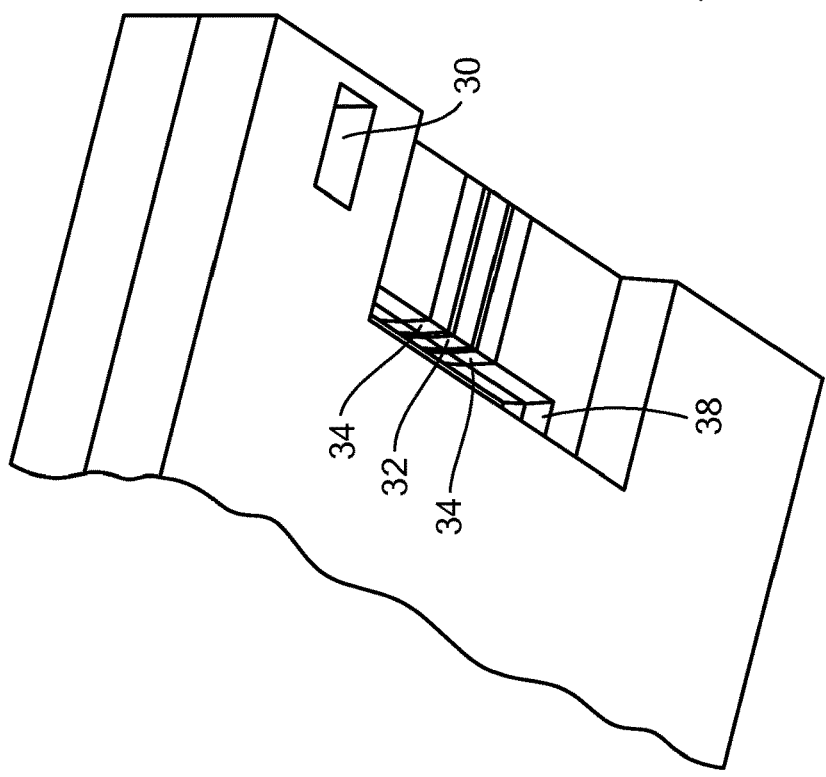
FIG. 3C is a bottom pictorial view of the embodiment of FIGS. 3A and 3B.

One embodiment of the invention is shown in FIGS. 2A and 2B. A body 20 is formed by silicon substrates or structures 22 and 24 which are bonded or fused together. A flow channel 26 is formed in the body and having at one end an opening 28 formed in substrate 22 and at the opposite end an opening 30 formed in substrate 24. These openings serve as inlet or outlet holes for the fluid which is caused to flow through the flow channel 26. A heater 32 and temperature sensors 34 are etched along the perimeter of the flow channel 26 on each wall thereof to form a complete loop or coil around the inside of the flow channel. Trenches 36 are provided in each substrate 22 and 24 on each side of the flow channel to reduce the thickness of the bulk material of the substrates and thereby reduce heat losses and consequent signal losses. At least one etched opening 38 is provided through the substrates 22 and 24 for the same purpose of providing thinned sidewalls of the flow channel.

Electrical connection is made to the heater 32 and temperature sensors 34 typically by conducting vias through one or more of the walls of the flow channel and corresponding conductive paths provided on one or more of the surfaces of substrates 22 and 24.

Another embodiment is shown in FIGS. 3A-3D in which the heater and temperature sensors are etched around the outside of the flow channel. The flow channel and inlet and outlet holes and structure of substrates 22 and 24 are as shown and described in the embodiment of FIGS. 2A and 2B above. In this other embodiment, the heater 32 and temperature sensors 34 are formed around the exterior surfaces outside of the flow channel.

Figure 4:
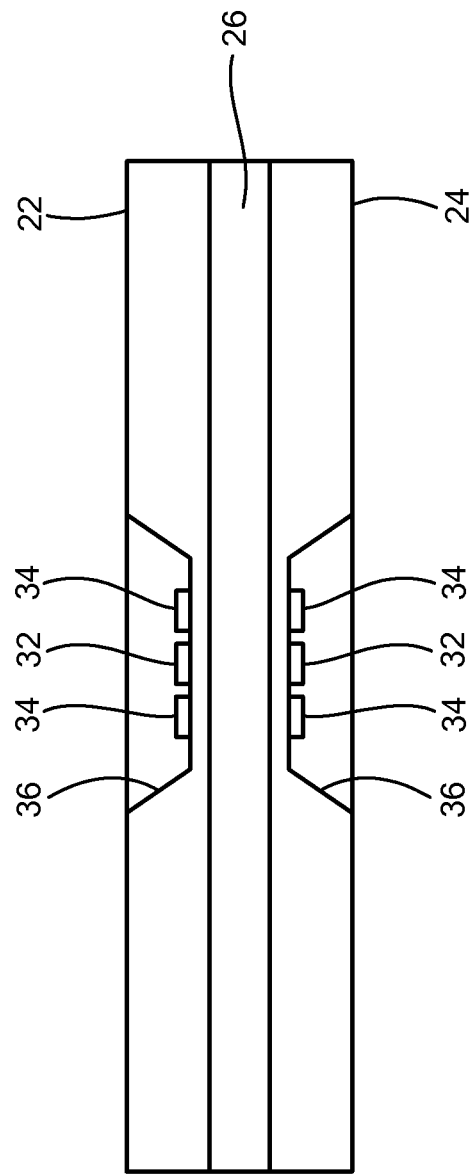
FIG. 4 is a diagrammatic elevation view of a further embodiment of a flow sensor in accordance with the invention.

In an alternative embodiment, the heater and temperature sensors can be etched on each wall outside of the flow channel but not connected to each other. The heaters are energized from a suitable source, and signals from the respective temperature sensors are received by the signal processing circuitry and processed to provide an indication of flow rate. When the width to height aspect ratio of the flow channel is high, heaters and temperature sensors on the shorter sidewalls are not necessary. An arrangement having a heater and temperature sensors on the wider top and bottom walls of a body is shown in FIG. 4. The body in FIG. 4 is similar to that of FIGS. 3A-3D. The heater and sensors on the top and bottom substrates 22 and 24 are separately formed on trenches 36.

Figure 5:
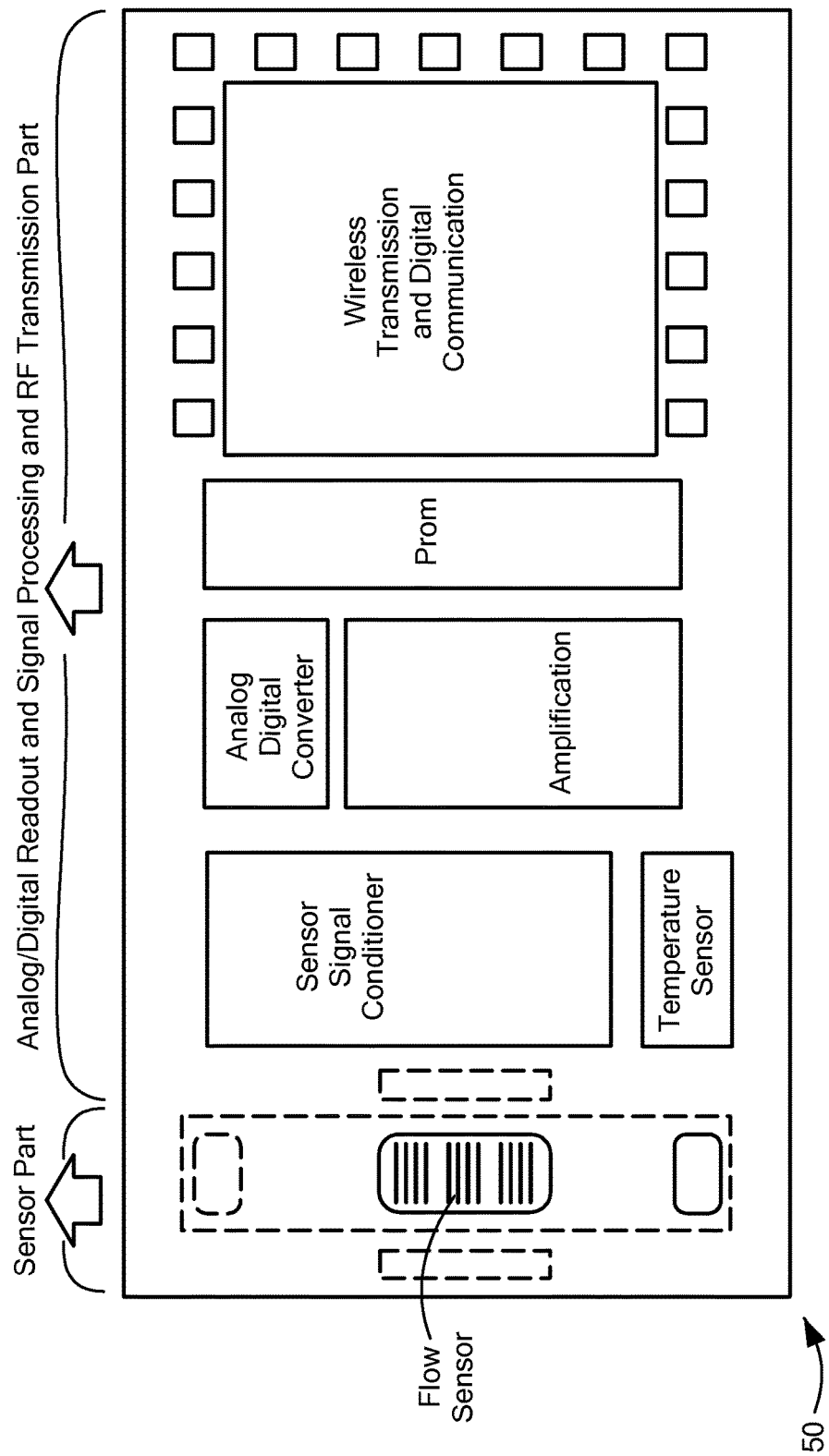
FIG. 5 is a block diagram of an integrated chip containing the flow sensor and associated circuitry in accordance with the invention.

In one preferred embodiment, the MEMSIC flow sensor is integrated in a single chip with associated circuitry. A block diagram of the chip 50 is shown in FIG. 5. The chip includes a sensor section containing the flow sensor channel and associated openings in the heater and temperature sensors. The signal processing portion of the chip includes at least one temperature sensor, signal conditioner, analog to digital converter, amplifier, prom memory and wireless transmission and digital communication circuitry.

Figure 6A:
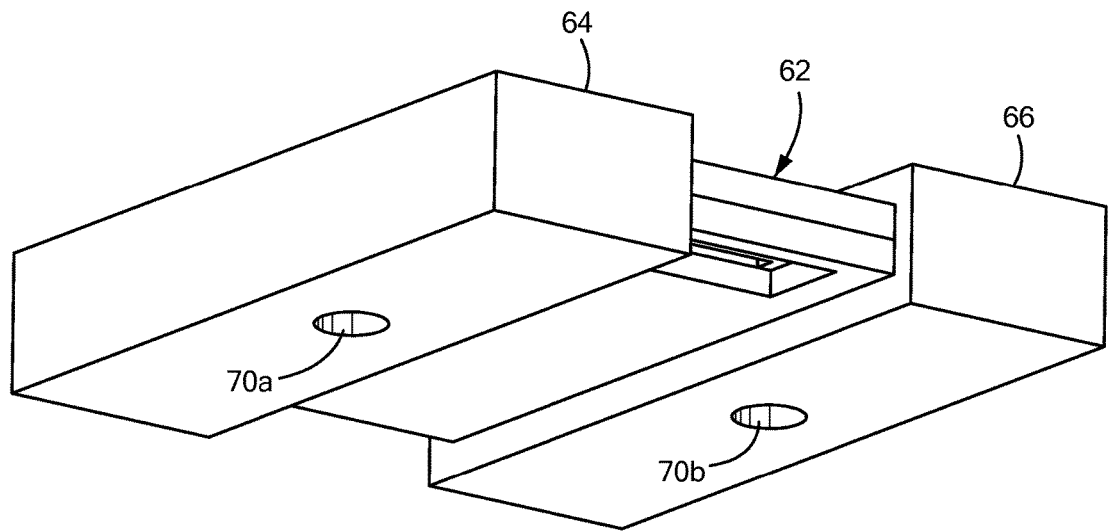
FIG. 6A is a pictorial view of a further embodiment of the invention.
Figure 6B:
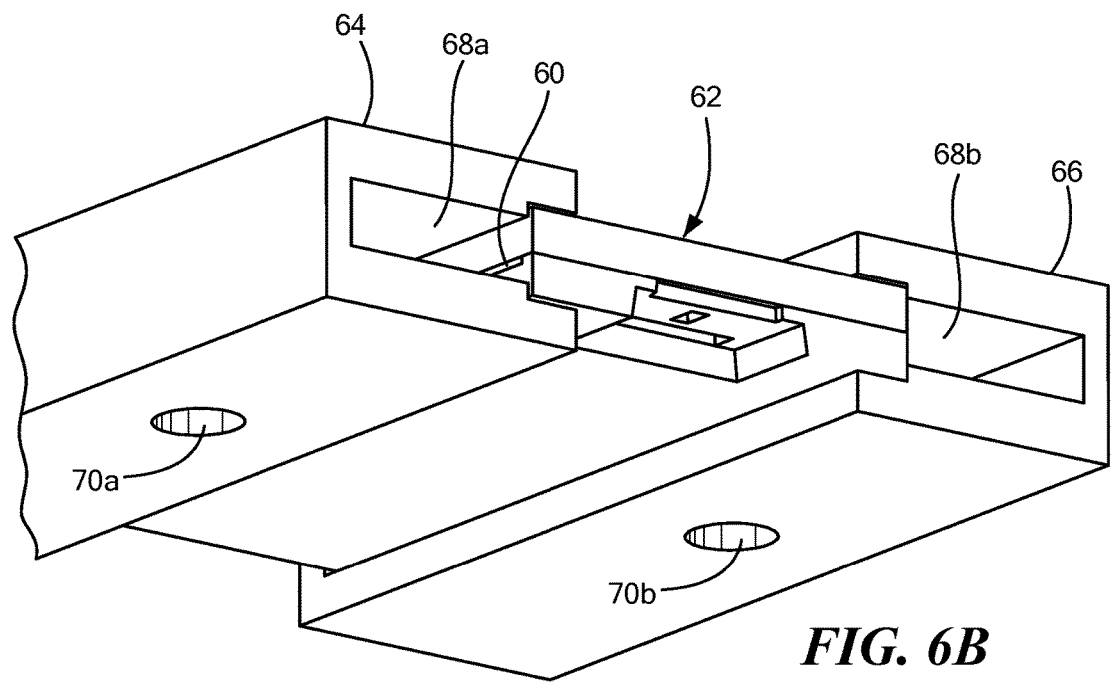
FIG. 6B is a cutaway pictorial view of the embodiment of FIG. 6A.

FIGS. 6A and 6B illustrate an embodiment having a flow channel 60 extending through the body 62 from one side to the other. The heater and temperature sensors may be formed inside or outside the flow channel as described above. The body 62 is bonded to housings 64 and 66 as shown in fluid tight sealed relation. Housing 64 has a chamber 68a coupled to an opening 70a. Housing 66 has a chamber 68b coupled to an opening 70b. The openings 70a and 70b serve as inlet and outlet ports which can be coupled to tubing or fittings by which fluid is supplied to and extracted from the flow channel.

Various alternatives and modifications will occur to those versed in the art without departing from the spirit and true scope of the present invention. Accordingly the invention is not to be limited by what has been particularly shown and described except as defined by the appended claims.

What is claimed is:
1. A MEMS flow sensor comprising:
    a body having a first semiconductor substrate and a second substrate bonded together;
    a micro flow channel etched in the body and having an etched inlet opening at a first face of the body and an etched outlet opening at an opposite face of the body, the micro flow channel extending through the body from the etched inlet opening at the first face to the etched outlet opening at the opposite face;
    a film heater integral with the body and associated with the flow channel to heat fluid flowing through the flow channel;
    at least one film temperature sensor integral with the body and associated with the flow channel in a position spaced along the flow channel from the film heater, the at least one film temperature sensor operative to sense a temperature of fluid flowing through the flow channel,
    wherein the film heater forms a first heater loop portion on the first semiconductor substrate and a second heater loop portion on the second substrate, and wherein the first heater loop portion and the second heater loop portion form a complete heater coil around an inside portion of the flow channel;
    wherein the at least one film temperature sensor forms a first sensor loop portion on the first semiconductor substrate and a second sensor loop portion on the second substrate, and wherein the first sensor loop portion and the second sensor loop portion form a complete sensor coil around another inside portion of the flow channel; and
    electronic circuitry integrated in the body and electrically connected to the film heater and the at least one film temperature sensor and operative to provide a signal representative of a rate of flow of a fluid flowing through the flow channel based at least in part on the temperature of fluid flowing through the flow channel sensed by the at least one film temperature sensor.

2. The MEMS flow sensor of claim 1, wherein at least one cavity is etched into a bulk material, the at least one cavity is configured to reduce heat loss from an etched conductor forming the film heater via thermal conduction; and
    the MEMS flow sensor further comprises a housing portion sealed to at least a portion of the body and having a fluid cavity in fluid communication with at least one of: the inlet opening and the outlet opening, the housing portion having a fluid port.

3. The MEMS flow sensor of claim 1 wherein the bonding process is a wafer-scaled process; and the MEMS flow sensor further comprises a housing portion sealed to at least a portion of the body and having a fluid cavity in fluid communication with at least one of: the inlet opening and the outlet opening, the housing portion having a fluid port.

4. The MEMS flow sensor of claim 3, wherein the film heater comprises an etched conductor; said etched conductor and the at least one film temperature sensor are overlaid with an overlay material including at least one of: a layer silicon nitride, glass, and an organic material, the overlay material being configured to prevent oxidation when oxygenated gas is the fluid to measure; and to prevent a short circuit when electrically conductive liquid is the fluid to measure.

5. The MEMS flow sensor of claim 3, further comprising at least one of: an integrated signal conditioner, an integrated amplification circuit, an integrated analog to digital conversion circuit, an integrated digital interface and an integrated wireless transceiver.

6. The MEMS flow sensor of claim 1, further comprising a first housing portion sealed to a first portion of the body and having a first fluid cavity in fluid communication with the inlet opening, the first housing portion having a first fluid port; and
a second housing portion sealed to a second portion of the body and having a second fluid cavity in fluid communication with the outlet opening, the second housing portion having a second fluid port.

7. The MEMS flow sensor of claim 1, further comprising:
an etched conductor; and
an overlay material covering the etched conductor and the at least one film temperature sensor,
wherein the overlay material including at least one of: a layer silicon nitride, glass, and an organic material,
wherein the overlay material is configured to prevent oxidation when oxygenated gas is the fluid to be measured.

8. The MEMS flow sensor of claim 7, further comprising a first housing portion sealed to a first portion of the body and having a first fluid cavity in fluid communication with the inlet opening, the first housing portion having a first fluid port.

9. The MEMS flow sensor of claim 1, further comprising:
an etched conductor; and
an overlay material covering the etched conductor and the at least one film temperature sensor,
wherein the overlay material including at least one of: a layer silicon nitride, glass, and an organic material,
wherein the overlay material is configured to prevent a short circuit when electrically conductive liquid is the fluid to be measured.

10. The MEMS flow sensor of claim 9, further comprising a first housing portion sealed to a first portion of the body and having a first fluid cavity in fluid communication with the inlet opening, the first housing portion having a first fluid port.

11. The MEMS flow sensor of claim 1, further comprising:
an etched conductor; and
an overlay material covering the etched conductor and the at least one film temperature sensor,
wherein the overlay material includes polyimide,
wherein the overlay material is configured to at least one of: prevent oxidation when oxygenated gas is the fluid to be measured, and prevent a short circuit when electrically conductive liquid is the fluid to be measured.

12. The MEMS flow sensor of claim 1, wherein the micro flow channel describes a lengthwise axis, the first face and the opposite face are perpendicular to the lengthwise axis.

13. The MEMS flow sensor of claim 1, wherein the first face and the opposite face are perpendicular to the micro flow channel.

14. The MEMS flow sensor of claim 1, wherein the second substrate comprises one of: a semiconductor substrate, a ceramic substrate and a glass substrate.

15. The MEMS flow sensor of claim 1, wherein the film heater comprises sputtered conductors.

* * * * *